United States Patent Office 2,899,750
Patented Aug. 18, 1959

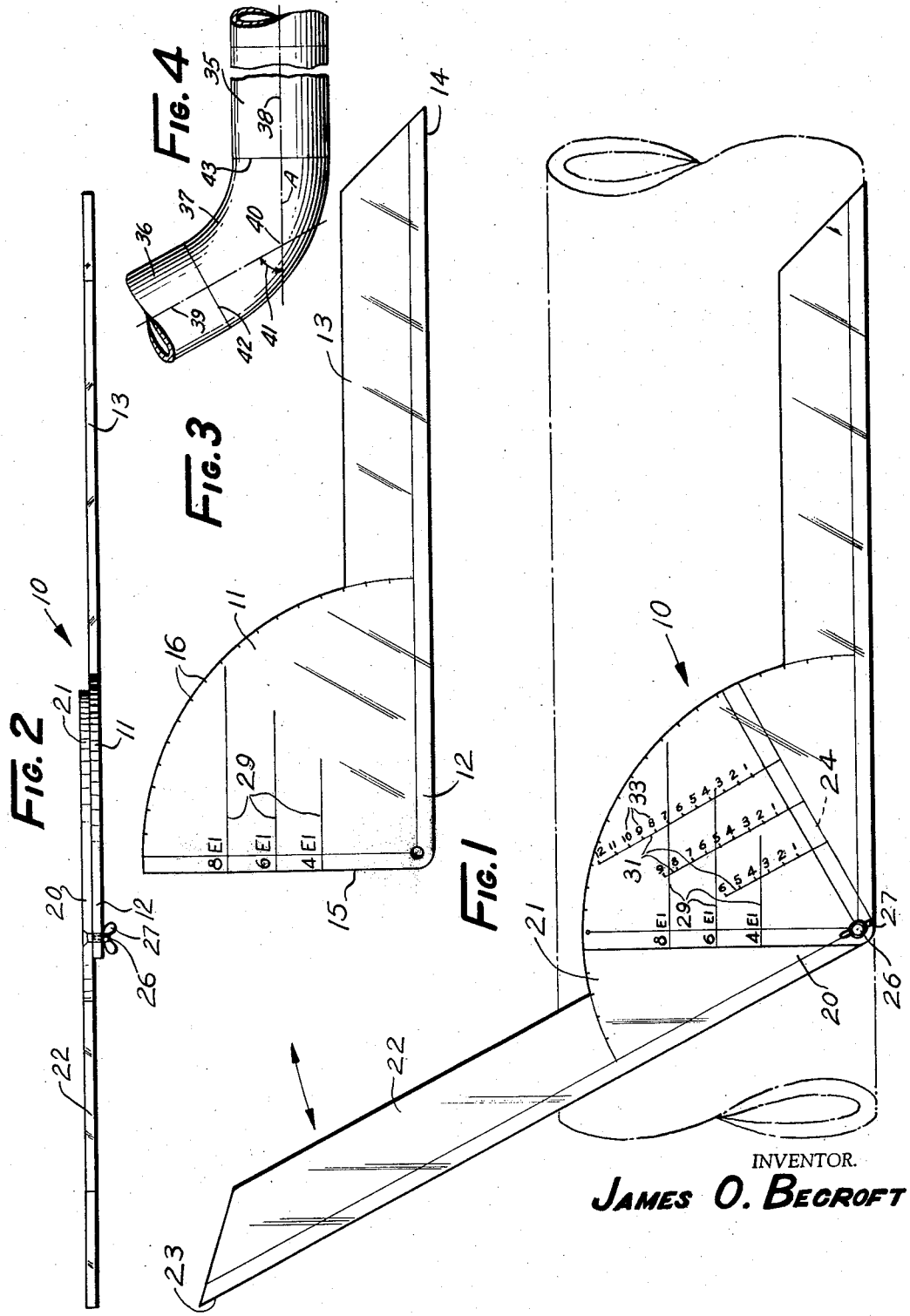

2,899,750

MEASURING DEVICE FOR PIPES

James O. Becroft, Wallingford, Conn.

Application August 19, 1957, Serial No. 679,013

3 Claims. (Cl. 33—75)

This invention relates to measuring apparatus and more particularly to a measuring device for pipes.

It is an object of the present invention to provide an instrument for measuring pipe layouts and providing the intersection point and resulting cut measurements of angularly related pipe sections connected together by elbows.

It is another object of the present invention to provide an instrument of the above type for facilitating the cutting of pipes and elbows to exact measurements in comformance with the original pipe layout so as to reduce the chance of error in laying out complicated pipe systems.

Other objects of the invention are to provide a pipe layout gauge bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view of an instrument made in accordance with the present invention in operative use;

Figure 2 is a top plan view of the apparatus shown in Figure 1;

Figure 3 is a side elevational view of one of the members of the instrument shown in Figure 1; and Fig. 4 is a side elevational view of two angularly connected pipe sections illustrating the use of the instrument.

Referring now more in detail to the drawing, a pipe layout measuring instrument 10 made in accordance with the present invention is shown to include a base member 12 having a quadrant 11 defined by a perpendicular edge 15 at one side and a rigid leg 13 having a straight edge 14 at the other side. The periphery of the quadrant 11 is also provided with degree markings 16 for purposes hereinafter described.

Another similar auxiliary member 20 is provided with a quadrant 21 defined at one side by leg 22 having a straight edge 23 and at the other side by a perpendicularly related edge 24. A bolt 26 pivotally connects the apices of the respective members 12, 20 together, an associated wing nut 27 being operative to secure the respective members in any desired angular relationship, with the quadrants lying in the interal angle between the members.

The base member 12 is also provided with a plurality of spaced parallel lines 29 that are parallel to the straight edge 14 and normal to the perpendicular edge 15. These lines represent different pipe sizes for purposes hereinafter described. A plurality of spaced parallel lines 31 on the auxiliary member 20 are parallel to the straight edge 23 thereof and normal to the perpendicular edge 24. These lines 31 are provided with equally spaced indicia 33 for purposes hereinafter described. It will be noted that the lines 31 on the auxiliary member 20 are spaced corresponding distances away from the axis of the bolt 26 as the related lines 29 on the base member 12.

The calibrations of this instrument are scaled to conform to the prevailing ratio of 3 to 2. For example, the radius of the pipe elbow is one and one-half times the diameter thereof. The pivot axis of the bolt 26 represents the intersection of a pair of intersecting pipes on the layout. The straight edges 14, 23 designate the direction of each pipe section and the angle defined therebetween, while the lines on each of the members represent the center lines of the elbow and are parallel with the respective edges of the associated members. These lines are one and one-half diameters distance from the pivotal axis of the bolt 26 so as to maintain the aforementioned ratio. As the members are rotated relative to each other so as to have the straight edges thereof placed in parallel relationship with the longitudinal axes of the respective pipe sections, the intersection of the respective pipe size lines 29 with the associated lines 31 on the other member indicates the inches of cut from the face of the elbow to the intersection point of the layout, this value being read directly from the indicia 33 where intersected by one of the lines 29 corresponding to the diameter of the pipe being used. This measurement is absolutely essential to the accuracy of the overall layout. While only three pipe sizes have been indicated in the drawing, it will be recognized that the device can be provided with suitable scales to accommodate all sizes of pipe.

In Fig. 4 of the drawings there are shown two angularly associated pipe sections 35 and 36 connected by the elbow 37. The center line of the pipe section 35 is indicated by the line 38 while that of the section 36 is indicated by the line 39, these lines intersecting at 40 and the angle of the elbow is that of the exterior angle 41 between these lines. The faces of the elbow are indicated by the lines 42 and 43.

In making the connection between the pipes 35 and 36 the distance from some point (such as a joint) on the line which includes the pipe 35 to the intersection 40 may be measured from the layout or at the place of installation. It then becomes necessary to determine the distance A between the intersection 40 (of the center lines of the pipes 35 and 36) and the face 43 of the elbow so that it will be known how much is to be cut off from the pipe 35 or how much is to be subtracted from the distance of the last joint of the pipe line from the point 40.

While the pivot point 26 of the instrument may be placed at the point 40, if desired, it is only necessary that the two edges 14 and 23 of the members 13 and 22 be placed parallel to the center lines of the pipe sections 35 and 36 so that the exterior angle between these members will be equal to the angle 41. If desired, the angle between the members 13 and 22 (if the angle 41 is known) may be set by the reading on the degree markings 16 on the quadrant 11.

When the members 13 and 22 have been set at the proper angle, the intersection of the lines 29 and 31 will determine the distance A which will be the inches of cut from the intersection 40 to the face 43 of the elbow, this reading being given by the calibrations 33 on the lines 31. It will, of course, be necessary to use the proper line 29 depending upon the diameter of the pipe being employed and the corresponding line 31. For instance, if an 8-inch pipe is employed, the upper line 29 marked "8" will be employed and it will be seen that this line intersects the outer of the lines 31 at the point marked "7" upon this line. This indicates that the distance A is 7 inches and that this much must be subtracted from the measured length between the last joint on the pipe 35 and the intersection 40.

While various changes may be made in the detail construction, it shall be understood that such changes shall be within the spirit and scope of the present invention as defined by the appended claims.

What I claim as new and desire to protect by Letters Patent of the United States is:

1. A gauge for measuring a pipe layout and defining measurements of cut from the intersection point of two connecting pipes comprising a base member and an auxiliary member, each of said base and auxiliary members having a straight side and a quadrant, pivot means securing said quadrants together in overlapping sliding engagement with said straight edges in intersecting angular relationship with each other and with said quadrants in the interior angle between said edges, said members being pivotally mounted for movement of said straight edges to selected angular relationships, one of said quadrants having thereon a set of spaced parallel lines running parallel to the associated straight edge to indicate diverse pipe diameters and the other of said quadrants having thereon a second set of spaced parallel lines running parallel to the straight edge associated with said quadrant, and the lines of one of said sets being calibrated to indicate, where crossed by the lines of the other set, the inches of cut from the face of an elbow to the intersection point of the pipe layout.

2. The combination according to claim 1, wherein one of said quadrants comprises a plurality of equally spaced apart degree markings adjacent to the peripheral edge thereof.

3. The combination according to claim 1, wherein said pipe diameter lines and said inches of cut lines are in variable intersecting engagement, and said inches of cut lines include indicia designated by said intersecting pipe diameter lines in response to relative rotation of said members.

References Cited in the file of this patent

UNITED STATES PATENTS

| | | |
|---|---|---|
| 1,299,978 | MacDowney | Apr. 8, 1919 |
| 2,653,387 | Cameron | Sept. 29, 1953 |
| 2,658,672 | Dalzell | Nov. 10, 1953 |